United States Patent
Miura

(10) Patent No.: US 7,634,719 B2
(45) Date of Patent: Dec. 15, 2009

(54) PRINT SYSTEM AND INFORMATION PROCESSING APPARATUS

(75) Inventor: Kiyotaka Miura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 781 days.

(21) Appl. No.: 11/269,598

(22) Filed: Nov. 9, 2005

(65) Prior Publication Data
US 2006/0055969 A1    Mar. 16, 2006

Related U.S. Application Data

(63) Continuation of application No. 10/143,794, filed on May 14, 2002, now Pat. No. 6,988,243.

(51) Int. Cl.
- G06F 17/00 (2006.01)
- G06F 15/16 (2006.01)
- G06F 3/12 (2006.01)

(52) U.S. Cl. .......... 715/224; 709/201; 358/1.1

(58) Field of Classification Search ........ 715/221, 715/224; 709/201; 358/1.1
See application file for complete search history.

(56) References Cited

U.S. PATENT DOCUMENTS

| | | | | |
|---|---|---|---|---|
| 5,754,857 A * | 5/1998 | Gadol | ............. | 709/203 |
| 5,845,303 A | 12/1998 | Templeman | ............. | 715/517 |
| 5,903,716 A * | 5/1999 | Kimber et al. | ............. | 358/1.13 |
| 5,907,675 A * | 5/1999 | Aahlad | ............. | 709/203 |
| 5,946,458 A * | 8/1999 | Austin et al. | ............. | 358/1.15 |
| 6,012,070 A | 1/2000 | Cheng et al. | ............. | 715/505 |
| 6,070,184 A * | 5/2000 | Blount et al. | ............. | 709/200 |
| 6,199,082 B1 | 3/2001 | Ferrel | ............. | 715/522 |
| 6,591,289 B1 | 7/2003 | Britton | ............. | 709/203 |
| 6,624,588 B2 | 9/2003 | Nakamura | | |
| 6,687,018 B1 | 2/2004 | Leong et al. | ............. | 358/1.15 |
| 6,714,964 B1 | 3/2004 | Stewart et al. | ............. | 709/203 |
| 6,742,126 B1 * | 5/2004 | Mann et al. | ............. | 726/5 |
| 6,771,386 B1 * | 8/2004 | Kato | ............. | 358/1.15 |
| 2001/0046066 A1 | 11/2001 | Ueda et al. | ............. | 358/1.15 |
| 2002/0004784 A1 | 1/2002 | Forbes | ............. | 705/51 |
| 2002/0048037 A1 * | 4/2002 | Carbone | ............. | 358/1.14 |
| 2002/0062342 A1 * | 5/2002 | Sidles | ............. | 709/203 |
| 2002/0063891 A1 | 5/2002 | Ueda | ............. | 358/1.15 |
| 2002/0063892 A1 | 5/2002 | Tsukada | ............. | 358/1.15 |
| 2003/0184791 A1 | 10/2003 | Mitani | ............. | 358/1.15 |

OTHER PUBLICATIONS

"Spyglass Prism: Concepts and Applications," Spyglass Inc, 1997.
Jing, Jin, et al., "Client-Server Computing in Mobile Environments," ACM Computing Surveys (CSUR), vol. 31, Issue 2, Jun. 1999, pp. 117-157.
Jansen, P. et al., Filing and Printing Services on a Local Area Network, ACM SIGCOMM Computer Communications Review, Proceedings of the Eighth Symposium on Data Communications, Oct. 1983, pp. 211-220.

* cited by examiner

Primary Examiner—Laurie Ries
(74) Attorney, Agent, or Firm—Fitzpatrick, Cella, Harper & Scinto

(57) ABSTRACT

It is desirable for a user to perform optimum printing business in an environment of a print system used by the user, without being conscious of a function of forming document printing data by a server and a function of forming the document printing data by a client. If software for the function of forming the document printing data by the client is installed in a terminal of the client operated by the user, document-form data and document data are distributed from the server to the client in order to use the function.

16 Claims, 16 Drawing Sheets

FIG.4

TABLE OF MONTHLY OVERTIME RECORD

YEAR: n1  MONTH: n2
NAME s1

| | 1 | 2 | 3 | 4 | 5 | 6 | 7 | 8 | 9 | 10 |
|---|---|---|---|---|---|---|---|---|---|---|
| ORDINARY | n3 | n4 | n5 | n6 | n7 | n8 | n9 | n10 | n11 | n12 |
| MIDNIGHT | | | | | | | | | | |
| | 11 | 12 | 13 | 14 | 15 | 16 | 17 | 18 | 19 | 20 |
| ORDINARY | | | | | | | | | | |
| MIDNIGHT | | | | | | | | | | |
| | 21 | 22 | 23 | 24 | 25 | 26 | 27 | 28 | 29 | 30 |
| ORDINARY | | | | | | | | | | |
| MIDNIGHT | | | | | | | | | | |

TOTAL OVERTIME n50
TOTAL MIDNIGHT OVERTIME n51

| PROOF STAMP | SAID PERSON | | SUPERIOR | |
|---|---|---|---|---|

FIG.5

| DOCUMENT-TEMPLATE IDENTIFIER | INDEX | SIZE | VALUE |
|---|---|---|---|
| XXXXX | S1 | 20 | XXXXX |
| | n1 | 12 | 1998 |
| | n2 | 12 | 10 |
| | n3 | 10 | 0 |
| | ⋮ | ⋮ | |
| | n49 | 10 | 1.5 |
| | n50 | 12 | 30 |
| | n51 | 12 | 7.5 |

504

- S601 RECEPTION OF NOTIFICATION OF DEPRESSION OF PRINTING BUTTON
- S602 RETRIEVE DOCUMENT
- S603 DETECT PATTERN OF VARIABLE DATA WITHIN DOCUMENT
- S604 FORM INDEX DATA
- S605 MERGE DOCUMENT-TEMPLATE DATA
- S606 GENERATE IMAGE
- S607 TRANSFER DATA

FIG.15

| |
|---|
| PROGRAM DODE CORRESPONDING TO FLOWCHART SHOWN IN FIG. 6 |
| PROGRAM DODE CORRESPONDING TO FLOWCHART SHOWN IN FIG. 7 |
| PROGRAM DODE CORRESPONDING TO FLOWCHART SHOWN IN FIG. 8 |
| PROGRAM DODE CORRESPONDING TO FLOWCHART SHOWN IN FIG. 12 |
| PROGRAM DODE CORRESPONDING TO FLOWCHART SHOWN IN FIG. 13 |
| PROGRAM DODE CORRESPONDING TO FLOWCHART SHOWN IN FIG. 14 |
| |

PRINT SYSTEM AND INFORMATION PROCESSING APPARATUS

CROSS-REFERENCE TO RELATED APPLICATION

This application is a continuation of application Ser. No. 10/143,794, file May 14, 2002, now U.S. Pat. No. 6,988,243, which is hereby incorporated by reference in its entirety.

BACKGROUND OF THE INVENTION

1. Field of the Invention

The present invention relates to a network print system for printing a document or the like by generating print data representing the document or the like, via a network.

2. Description of the Related Art

As the Internet has rapidly developed and a large number of Web servers have appeared, business processing through the Web has been progressing. Business processing by a Web browser and a Web server has been widely adopted in which a personal computer connected to a network only mounts the Web browser capable of displaying and inputting information. In such a case, information necessary for business processing is exchanged between the Web server and the Web browser.

The Web server receives information input from the Web browser, processes the information within the Web server, and transmits the processed information to the Web browser. The Web server displays the processed information. By repeating such an operation, business is achieved.

Problems in business processing by the Web browser and the Web server relate to print processing which is indispensable in business processing. Particularly, a beautiful print conforming to a format for a document or the like cannot be obtained.

Although an ordinary Web browser provides a print function, this function causes a printer controlled by the Web browser (or a printer controlled by a computer where the Web browser is started) to print a hard copy of an image displayed on the Web browser. In this print system, when printing an image whose size exceeds a sheet size or an image present on a plurality of pages, there exists a problem of how the image is to be divided on different pages, and a print desired by the user cannot be provided in most cases.

In order to solve such a problem, a print system can be considered in which a print-system server having a Web server generates print-image data (for example, document printing data) in accordance with an instruction from a Web browser, and the generated data is distributed to a client where the Web browser is started. In this print system, the server always generates printing data corresponding to each instruction, and sequentially transmits generated data to the client. This function is termed a server-side making function.

In this print system via a Web browser, final print-image data is generated at the print-system server side. Accordingly, if request are intensively generated from a large number of clients, the load at the print-system server side increases. Particularly, intensive generation of requests from a large number of clients is a characteristic in a network system via the Web.

Furthermore, since print-image data is generated utilizing a printer driver at the print-system server side, in order to cause a printer to print the print-image data at the client side, a printer driver at the client side must sometimes be identical to the printer driver at the print-system server side.

In addition, the amount of print-image data generated at the print-system server side increase depending on the contents of the data. If the print-image data is distributed to the client side, the load of the network also increases.

In order to solve such problems, in another approach, by distributing form data used for generating print-image data to the client side instead of distributing print-image data from the print-system server side, and providing a plurality of types of locations for storing distributed form data at the client side, overlay processing for generating print-image data can be efficiently and effectively performed. This function is termed a client-side making function.

However, a user who is not familiar with a print system cannot sometimes know whether or not the client-side making function can be utilized at the terminal of a client used by the user. Accordingly, it is desirable that the user can perform an optimum printing operation in an environment of a print system used by the user, without being conscious of the server-side making function and the client-side making function. For that purpose, it is desirable that the client-side making function is used if software for the client-side making function is installed in the terminal of a client operated by the user, and that server-side making function is used if the software is not installed.

SUMMARY OF THE INVENTION

It is an object of the present invention to solve the above-described problems.

According to one aspect of the present invention, a print system consisting of a server and a client includes acquisition means for acquiring a template for generating print data corresponding to information displayed at the client, and data to be inserted in the template, in response to a request from the client, generation means for generating the print data corresponding to the displayed information, based on the template and the data acquired by the acquisition means, function acquisition means for acquiring information about a function of the client, and determination means for determining whether the template and the data acquired by the acquisition means are to be transferred from the server to the client, or the print data generated by the generation means is to be transferred from the server to the client, in accordance with the information acquired by the function acquisition means.

According to another aspect of the present invention, an information processing apparatus capable of communicating with an external apparatus includes acquisition means for acquiring a template for generating print data corresponding to information displayed at the external apparatus, and data to be inserted in the template, in response to a request from the external apparatus, generation means for generating the print data corresponding to the displayed information, based on the template and the data acquired by the acquisition means, function acquisition means for acquiring information about a function of the external apparatus, and determination means for determining whether the template and the data acquired by the acquisition means are to be transferred to the external apparatus, or the print data generated by the generation means is to be transferred to the external apparatus, in accordance with the information acquired by the function acquisition means.

According to still another aspect of the present invention, a program to be executed in an information processing apparatus capable of communicating with an external apparatus includes steps to be executed by a computer. The steps includes an acquisition step of acquiring a template for generating print data corresponding to information displayed at the external apparatus, and data to be inserted in the template, in response to a request from the external apparatus, a generation step of generating the print data corresponding to the displayed information, based on the template and the data acquired in the acquisition step, a function acquisition step of acquiring information about a function of the external apparatus, and a determination step of determining whether the template and the data acquired in the acquisition step are to be transferred to the external apparatus, or the print data generated in the generation step is to be transferred to the external apparatus, in accordance with the information acquired in the function acquisition step.

According to yet another aspect of the present invention, a storage medium capable of being read by a computer in which a program to be executed in an information processing apparatus capable of communicating with an external apparatus is stored includes steps to be executed by a computer. The steps includes an acquisition step of acquiring a template for generating print data corresponding to information displayed at the external apparatus, and data to be inserted in the template, in response to a request from the external apparatus, a generation step of generating the print data corresponding to the displayed information, based on the template and the data acquired in the acquisition step, a function acquisition step of acquiring information about a function of the external apparatus, and a determination step of determining whether the template and the data acquired in the acquisition step are to be transferred to the external apparatus, or the print data generated in the generation step is to be transferred to the external apparatus, in accordance with the information acquired in the function acquisition step.

According to yet a further aspect of the present invention, an information processing method in an information processing apparatus capable of communicating with an external apparatus includes steps to be executed by the information processing apparatus. The steps includes an acquisition step of acquiring a template for generating print data corresponding to information displayed at the external apparatus, and data to be inserted in the template, in response to a request from the external apparatus, a generation step of generating the print data corresponding to the displayed information, based on the template and the data acquired in the acquisition step, a function acquisition step of acquiring information about a function of the external apparatus, and a determination step of determining whether the template and the data acquired in the acquisition step are to be transferred to the external apparatus, or the print data generated in the generation step is to be transferred to the external apparatus, in accordance with the information acquired in the function acquisition step.

The foregoing and other objects, advantages and features of the present invention will become more apparent from the following detailed description of the preferred embodiment taken in conjunction with the accompanying drawings.

BRIEF DESCRIPTION OF THE DRAWINGS

FIG. 4 is a diagram illustrating a document form used in printing;

FIG. 5 is a diagram illustrating a table of variable data to be embedded in figure data;

FIG. 15 is a diagram illustrating a storage medium storing program codes; and

DETAILED DESCRIPTION OF THE PREFERRED EMBODIMENT (Document Print System)

Figure 1:
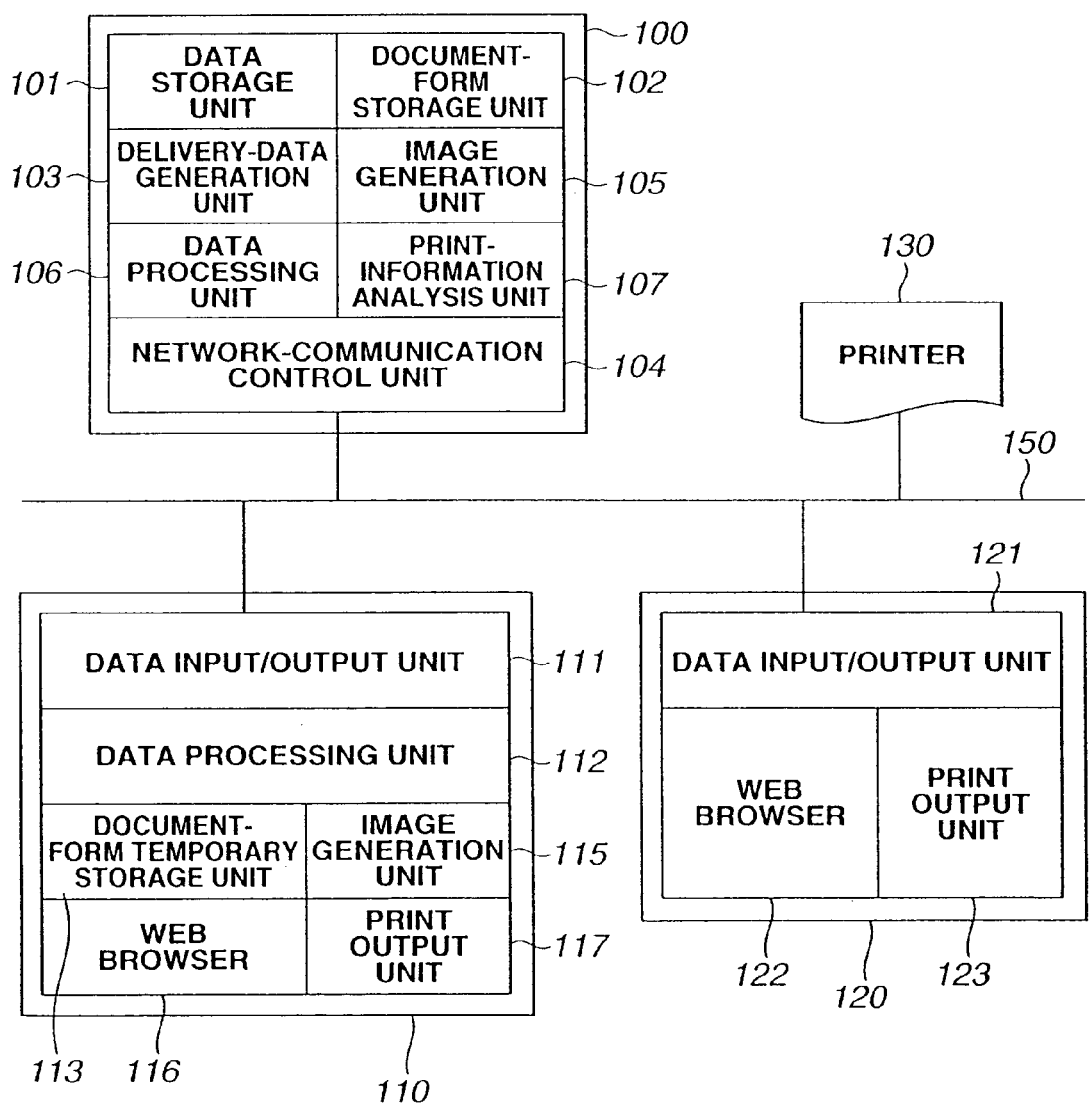
FIG. 1 is a diagram illustrating the functional configuration of a document print system.

FIG. 1 is a diagram illustrating the functional configuration of a document print system.

In FIG. 1, an information processing apparatus 100 operates as a server of the document print system (hereinafter abbreviated as a "server"). A data storage unit 101 including databases stores data for each business. The data is, for example, provided in the form of a database. In some cases, data input from a Web browser is directly stored in the data storage unit 101.

A document-form storage unit 102 stores document forms for printing that are used when printing documents (also termed document-form data). A document form corresponds to each Web document read from the server by a client. Accordingly, when the server transmits a Web document corresponding to a document form to the client, the server stores an identifier corresponding to the Web document. An identifier for a corresponding Web document is provided for a document form stored in the document-form storage unit 102 as a document-form identifier.

A distribution-data generation unit 103 generates distribution data obtained by synthesizing data and a document form necessary for image generation, based on a request from the client.

A network-communication control unit 104 has a Web-server function. The Web-server function is a function to support the HTTP (Hyper Text Transfer Protocol), the FTP (File Transfer Protocol) and the like, and can transmit a document data file (a Web document) or the like, described with the HTML (Hyper Text Markup Language) or the like, assigned by a URL (Uniform Resource Locator) to a client on a network in response to a request.

An image generation unit 105 forms document printing data in a determined form. The image generation unit 105 forms document printing data in a predetermined form which can be interpreted by a print output unit 123, by combining a document form and data to be overlaid therein. A data processing unit 106 performs data processing in accordance with an application program for each business. A print-information analysis unit 107 performs determination of a printing capability of a client, or the like.

An information processing apparatus 110 comprises a PC (personal computer) or the like, serving as a client of the document print system (hereinafter abbreviated as a "client"). A data input/output unit ill inputs/outputs data from/to a server of the document-print system (hereinafter abbreviated as a "server"). The data input/output unit 110 exchanges data with the server 100 via a network 150, such as a telephone line, a LAN (local area network) or the like, and performs processing for a layer lower than the HTTP. A data processing unit 112 analyzes distribution data generated the distribution-data generation unit 103, and restores data and a document form necessary for image generation from the data. A document-form temporary storage unit 113 stores a document form restored by the data processing unit 112. An image generation unit 115 forms document printing data in a predetermined form which can be interpreted by a print output unit 117, by combining a document form and data to be overlaid therein.

A Web browser 116 is an application program having the function of displaying a document data file (a Web document) described by the HTML or the like, and displays a Web document received from a Web server. The Web browser 116 has the function of not only displaying a Web document but also inputting data on a picture frame in accordance with the description of the HTML and transmitting the data to the Web server. The Web browser 116 acquires a Web document from the server in accordance with the input URL. The client 110 has the client-side making function with the document-form storage unit 113, the data processing unit 112 and the image generation unit 115. The print output unit 117 converts data formed by the image generation unit 115 into a form capable of being output from a printer, and is generally called a printer driver.

An information processing apparatus 120 comprises a PC or the like, serving as a client of the document print system (hereinafter abbreviated as a "client"). However, the client 120 does not have the client-side making function. A data input/output unit 121 inputs/outputs to/from a server of the document print system (hereinafter abbreviated as a "server"). The data input/output unit 121 exchanges data with the server 100 via the network 150, such as a telephone line, a LAN or the like, and performs processing for a layer lower than the HTTP.

A Web browser 122 is an application program having the function of displaying a document data file (a Web document) described by the HTML or the like, and displays a Web document received from a Web server. The Web browser 116 has the function of not only displaying a Web document but also inputting data on a picture frame in accordance with the description of the HTML and transmitting the data to the Web server. The Web browser 122 acquires a Web document from the server in accordance with the input URL. A print output unit 123 converts formed data into a form capable of being output from a printer, and is generally called a printer driver.

Reference numeral 130 represents a printer. The network 150 connects the server to the client, and comprises, for example, a LAN, the Internet or a radio. In this embodiment, the network 150 conforms to a communication procedure in a Web environment (for example, the TCP/IP (Transmission Control Protocol/Internet Protocol), or the HTTP).

Figure 3:
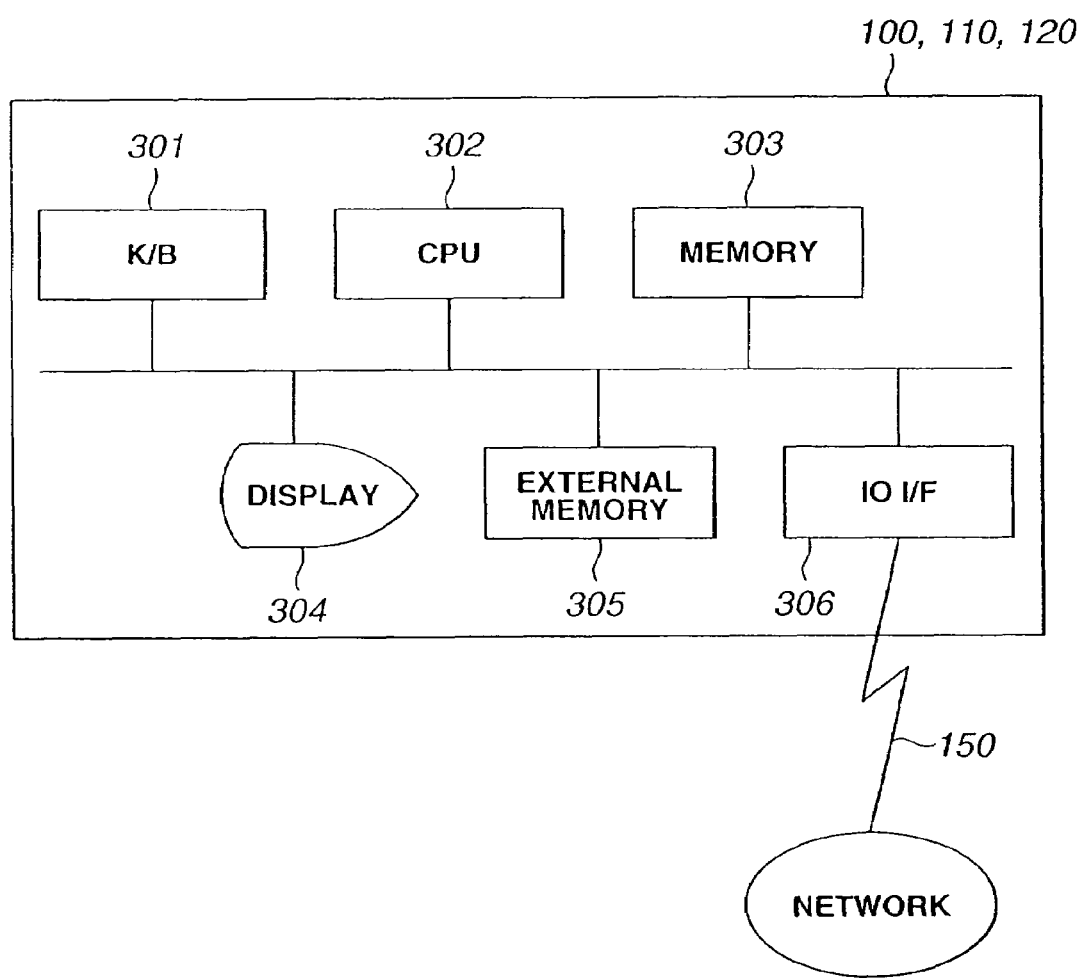
FIG. 3 is a diagram illustrating the hardware configuration of a client and a server.

FIG. 3 is the hardware configuration of control of the client and the server. A program corresponding to each of the unit 103-107, 111, 112, 115-117, and 121-123 shown in FIG. 1 is loaded in a memory 303, and is realized by being executed by a CPU (central processing unit) 302 of the computer. These programs, and the data storage unit 101, the document-form storage unit 102, the document-form temporary storage unit 113 and a document-form permanent storage unit 114 are stored in an external memory 305, such as a hard disk. The external memory 305 may comprise a detachable storage medium, such as a floppy disk or a CD(compact disc)-ROM (read-only memory).

A Web browser or an image is displayed on a display 304. An I/O (input/output) interface 306 is a port for performing connection with the network 150, or an external apparatus such as a printer. The user performs necessary input using a keyboard 301 or a pointing device.

(Display on a Web Browser)

Next, a print instruction from a Web browser (116 or 122) will be described. By communicating with the data input/output unit 111 or 121, the server 100 performs reception and analysis of data input from a Web browser, data retrieval corresponding to the received data, and transmission of the result of the retrieval to the data input/output unit 111 or 121. The Web browser displays buttons in accordance with a Web document distributed from the server. When the user depresses the buttons, various requests are transmitted to the server via the data input/output unit 111 or 121. These buttons are displayed on the display of the computer, and are selected and depressed by inputs from a pointing device, such as a mouse, or a keyboard.

Figure 2:
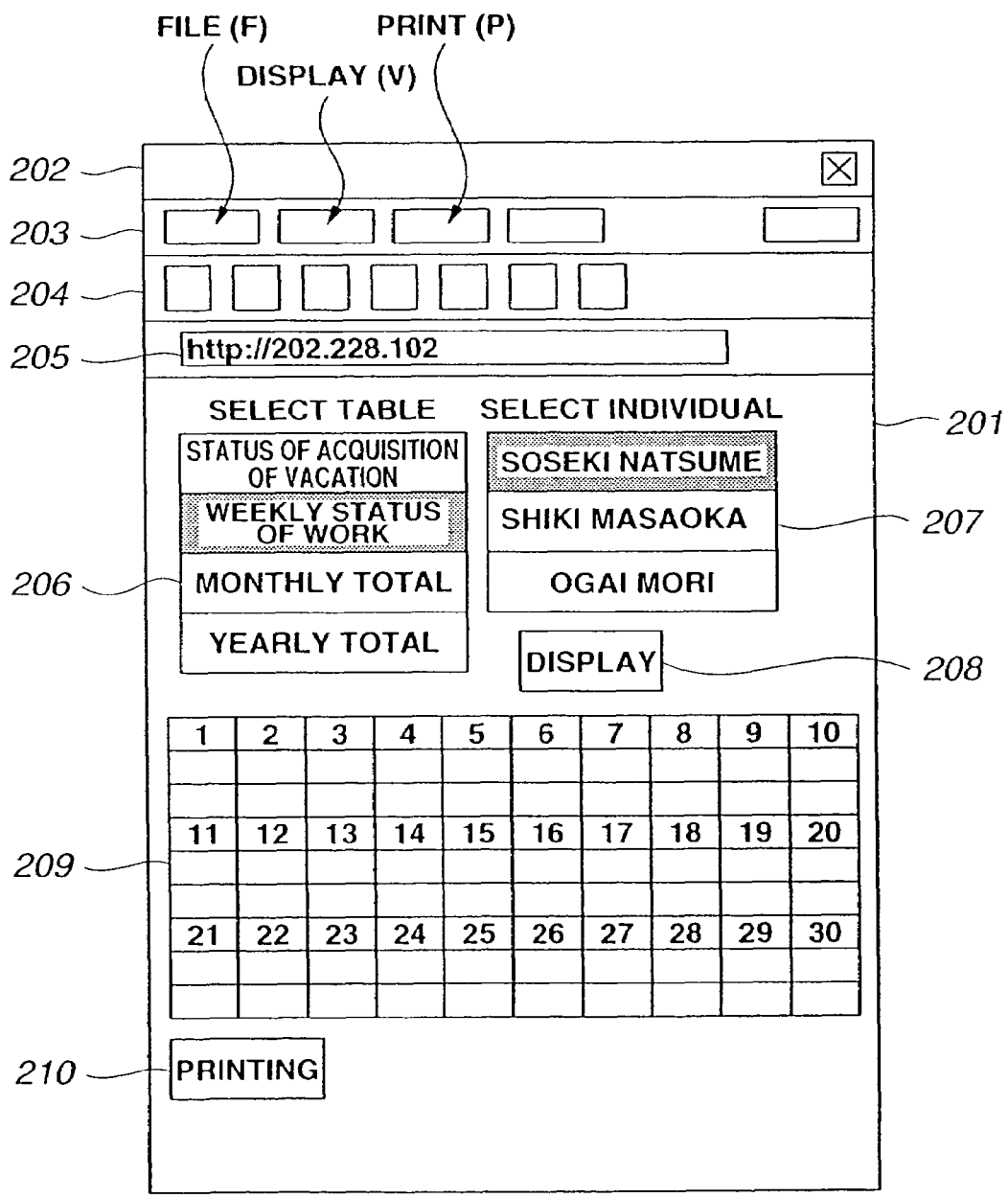
FIG. 2 is a diagram illustrating display of a page for business processing in a Web browser.

FIG. 2 is a diagram illustrating display of a page for business processing at the Web browser. A printing button in the document print system is provided on an image display region of the Web browser.

Reference numeral 201 represents a window of the Web browser displayed on a monitor or a display device of the client. A window title is displayed in an area 202. Commands possessed by the Web browser are displayed in areas 203 and 204. A command for printing an image displayed at the Web browser is also included in these areas. Reference numeral 205 represents a text field for inputting an address (such as a URL) of the server to be accessed. The user can select respective items in fields 206 and 207. By depressing a display button 208, items selected by the user in columns of the fields 206 and 207 are transmitted to the server, and a response from the server is awaited. The server generates display data (HTML document data for display) of a document based on a document name selected from the field 206 and the name of a person selected from the field 207, and transmits the generated data to the client. The Web server displays an image of the document 209 based on the document display data.

In the case of FIG. 2, the server acquires data relating to the status of work of Mr. Soseki Natsume by retrieving the data storage unit 101, generates document display data (a Web document for displaying the image of the document in this case) based on the acquired data, and transmits the generated data to the client. Then, the monthly document 209 is displayed at the browser. Reference numeral 210 represents a printing button in the document print system.

When reading the page of a document of the server from the client, the Web browser is started at the client. When the user inputs http://202.228.102 as shown in FIG. 2, Web document data including the columns 206-210 is transmitted from the server to the Web browser.

(Server-Side Making Function)

A description will now be described of the operation when the printing button 210 is depressed in the Web browser 122 of the client 120 which does not have the client-side making function. In a printing operation, a document to be printed is formed by inserting data in a document form for printing which corresponds to a form identifier. When the printing button 210 is depressed, information indicating depression of the printing button 210 is transmitted to the server. The server retrieves a document form stored in the document-form storage unit 102, based on an identifier attached to a Web document (a document page) transmitted to the client that has requested printing. Each document form is stored so as to be retrievable using a form identifier.

FIG. 4 illustrates a document form used for printing. Figure data (document data) in the document form is classified into fixed data and variable data. A character string of the document title 401, numerals 402 indicating frames, dates and the like, and character strings and frames 403 are fixed data. Values (document data) retrieved from the database or the like are embedded in s2, n1-n12, n50 and n51 of the areas 404 and 405.

FIG. 5 is a table of variable data to be embedded in the figure data shown in FIG. 4.

This table is prepared for each document form. A document-form identifier 504 is attached so as to identify a document form. In the table shown in FIG. 5, an index 501 of variable data, the size of a character to be displayed 502 of the variable data, and an actual value (a numeral string or a character string) 503 of the variable data are stored for each of the variable data s1, and n1-n51. By merging the document form shown in FIG. 4 and the value of each variable data shown in FIG. 5 based on the corresponding index, document printing data is formed.

Figure 6:
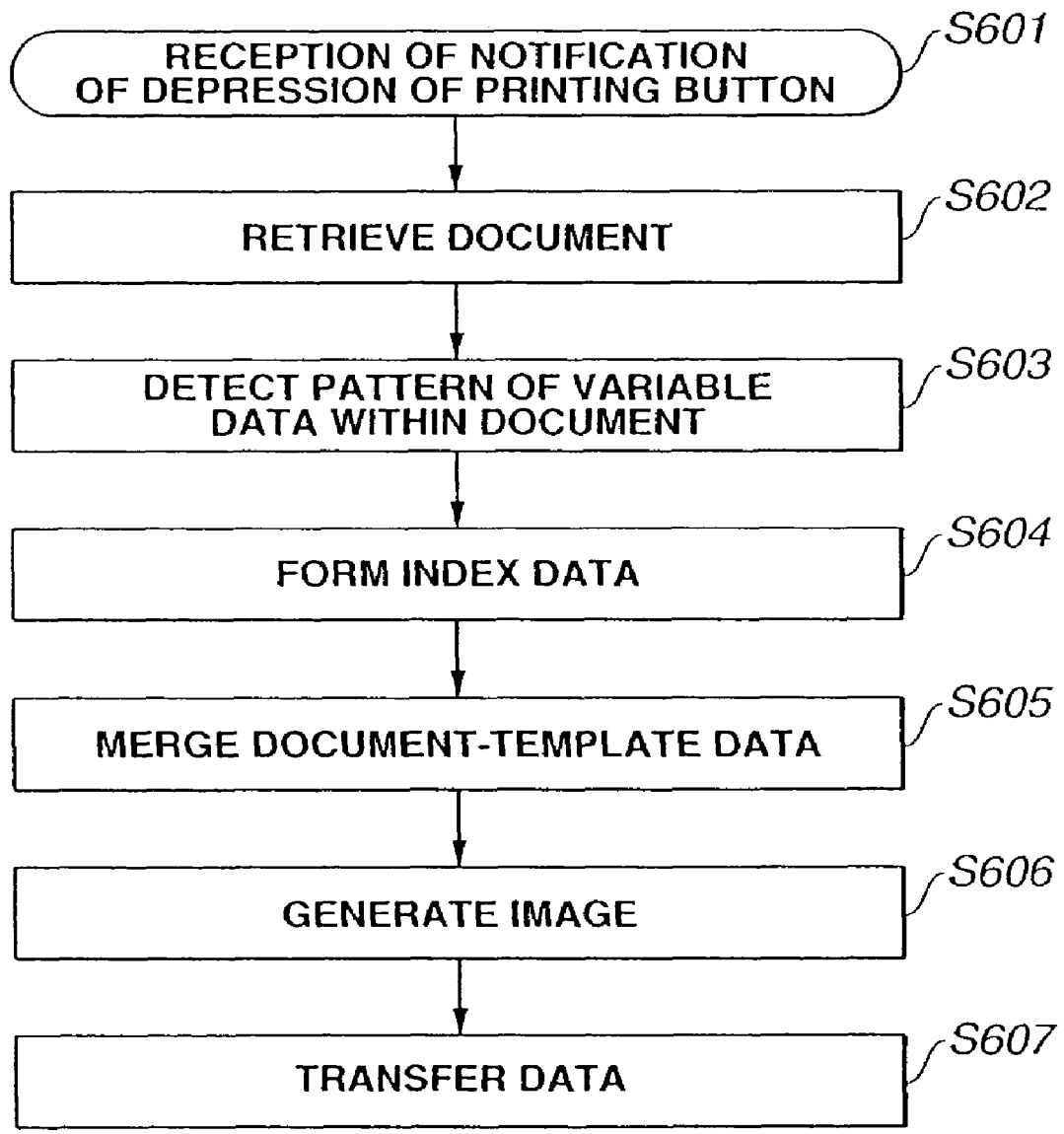
FIG. 6 is a flowchart illustrating processing in which the server actually generates document printing data and transmits the generated data to the client.

FIG. 6 is a flowchart illustrating processing in which the server actually generates document printing data and transmits the generated data to the client 120. This processing is executed by the server upon reception of information indicating depression of the printing button 210. Steps S701-S704, S705-S706, and S707 are performed by the data processing unit 106, the image generation unit 105, and the network-communication control unit 104, respectively.

When the server has received the notification of depression of the printing button 210 in step S601, then, in step S602, a document form to be used is retrieved. Since the identifier of the Web document already transmitted to the client is stored, the document form to be used can be retrieved based on the stored identifier.

In step S603, the position of the column of variable data to be included within the document form detected by the retrieval is detected. Then, in step S604, index data is formed. That is, the value of variable data in the table shown in FIG. 5 is described so as to be adjusted to the position of the column of the variable data that has been extracted in step S603, in accordance with the index. Thus, the index data describing the portion of the variable data is obtained.

Then, in step S605, the image generation unit 105 merges the fixed-data portion of the document form obtained in step S602 and the index data formed in step S604. In step S606, the image generation unit 105 forms document printing data described in an actual image form, i.e., a form which can be interpreted by the print output unit 117, based on the merged data formed in step S605.

In step S607, the document printing data formed in step S606 is transmitted to the client 120. Although in this step, data is transmitted to the client 120, the URL of the data file of the formed document printing data may be transmitted to the client 120, instead of transmitting the formed document printing data itself to the client. In such a case, the client 120 receives the data file from the server by automatically requesting transmission of the data file utilizing the FTP instead of the HTTP, by using the URL received by the Web browser.

Figure 7:
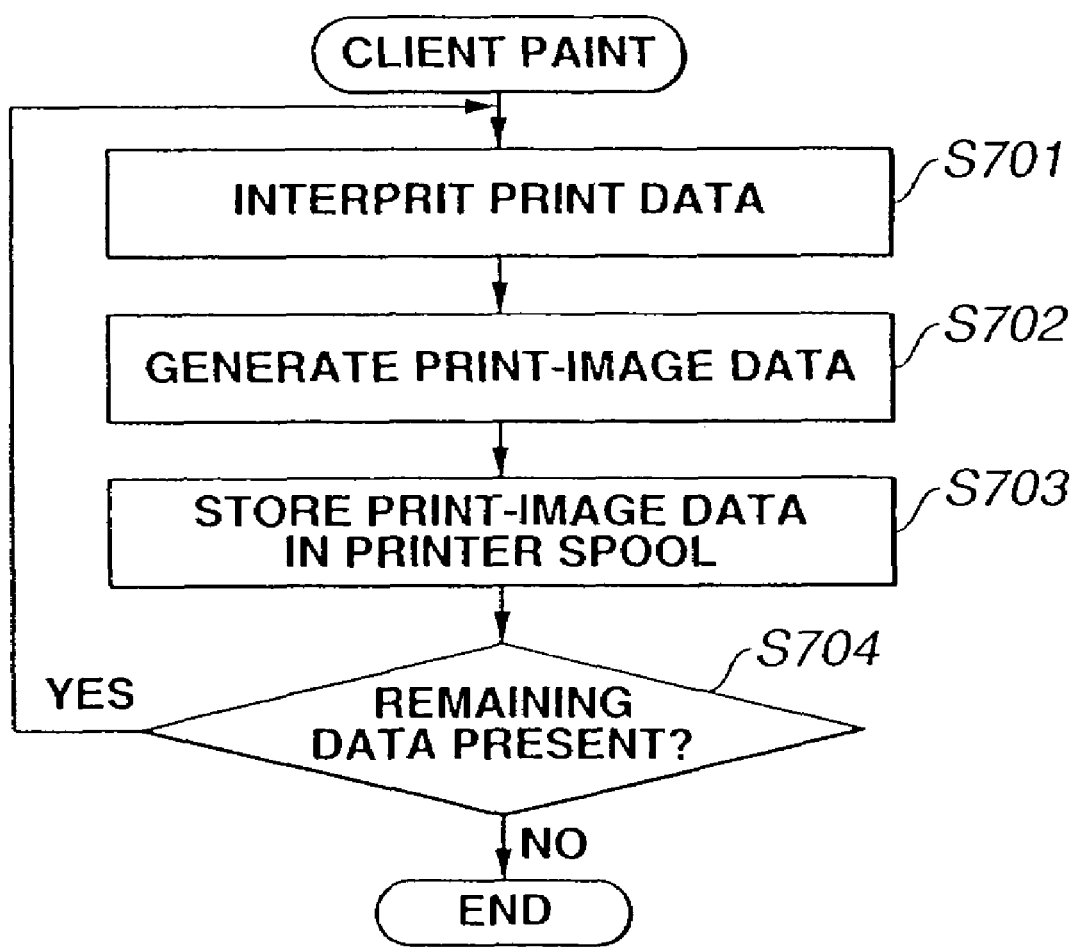
FIG. 7 is a flowchart illustrating processing performed by the client that has received the document printing data transmitted from the server.

FIG. 7 is a flowchart illustrating processing by the client 120 that has received the document printing data transmitted from the server in step S607 shown in FIG. 6.

First, in step S701, the print output unit 123 analyzes the received document printing data, and finds a printer adapted to the received document printing data. In the case of FIG. 1, since only a single printer is present, the printer 130 is selected. In step S702, the print output unit 123 generates print-image data which can be output from the printer 130, based on the result of the analysis. In step S703, the generated data is stored in a print spool. Then, print-image data is sequentially output to the printer 130. The above-described processing is repeated until all the received document printing data is analyzed and is converted into print-image data.

According to the above-described procedure, it is possible to assign output data from the client using the Web browser, and perform printing in an appropriate form. In contrast to a case in which a displayed document is printed, by printing a document using a document form formed for printing, an image formed using the Web browser can be output as a high-quality print. Either of the server and the client can cause a printer of any of the server and the client to print a high-quality document in accordance with the user's convenience. Only the server holds document forms and synthesizes data with a corresponding document form. Hence, the client can print a high-quality document via the server if a commercially available Web browser is prepared. Accordingly, the load of the client is low, and the client can utilize an inexpensive personal computer, or a portable information terminal only having a Web-browser function.

(Client-Side Making Function)

Although in the above-described document print system, the server generates document printing data, it is also possible that the server transmits necessary document form and document data to the client, and the client generates document printing data. This function is termed a client-side making function.

Figure 8:
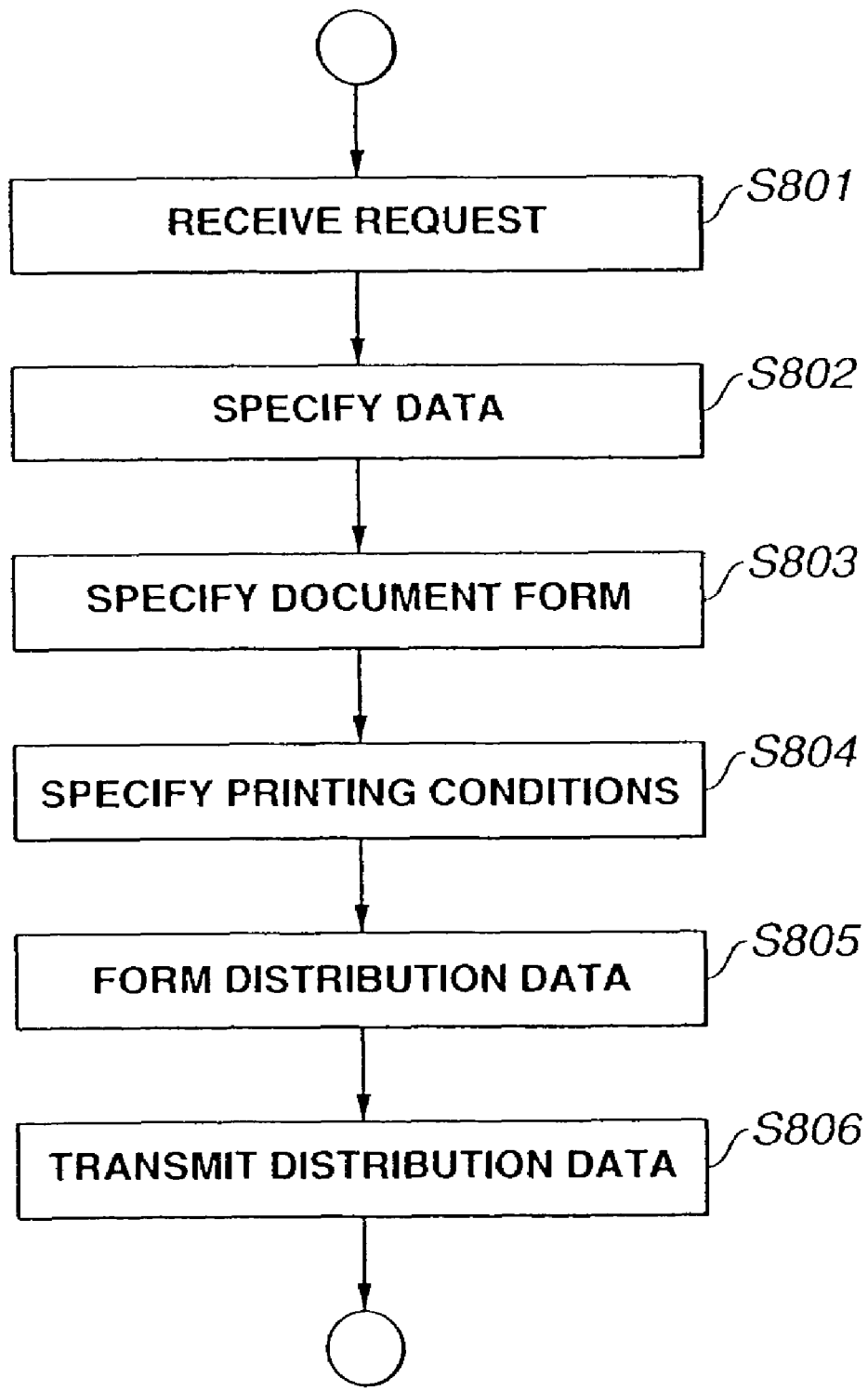
FIG. 8 is a flowchart illustrating processing in which the server that has received a request for printing from the client forms distribution data.

A description will now be provided of the flow for generating and outputting document printing data by the client 110 having the client-side making function. FIG. 8 is a flowchart illustrating the flow of processing in which the server that has received a request for printing from the client 110 forms distribution data. Steps S1001-S1005 are executed by the distribution-data generation unit 103, and step S1006 is executed by the network-communication control unit 104.

First, in step S801, a request received from the Web browser 116 (a HTTP request) is analyzed. In steps S802 and 803, data necessary for generating document printing data requested by the client, particularly a document form and document data, are specified. In step S804, printer information, the number of prints and the like (generically termed "printing conditions") when the printer executes a printing operation after the client has generated an image are specified.

In step S805, the sets of information necessary for image generation specified in steps S802-S804 are synthesized into single data, serving as distribution data. In step S806, the formed distribution data is transmitted to the client 110.

Figure 9:
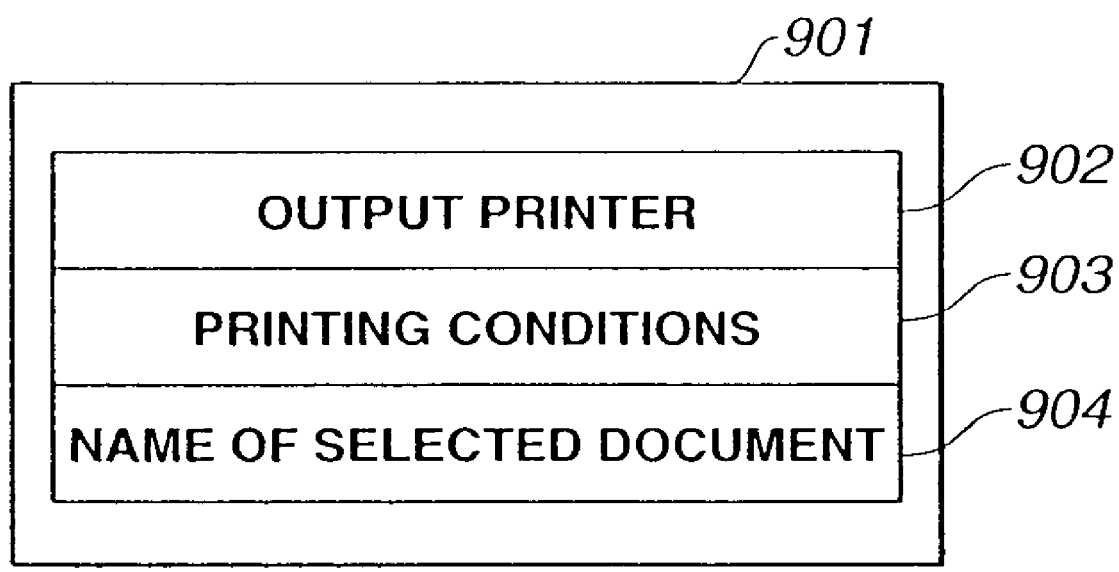
FIG. 9 is a diagram illustrating information included in a request for printing (a HTTP request) that has received from the client.

FIG. 9 illustrates information included in the request of printing (HTTP request) received from the client. In FIG. 9, reference numeral 901 represents the HTTP request itself transmitted from the client. Reference numeral 902 represents output-printer information relating to a printer assigned by the client. Reference numeral 903 represents conditions during a printing operation to be assigned at image generation, such as the document name, the number of prints, assignment of duplex/simplex printing, and assignment of a tray of the printer. Reference numeral 904 represents the name of the document to be printed that has been selected by the client.

Figure 10:
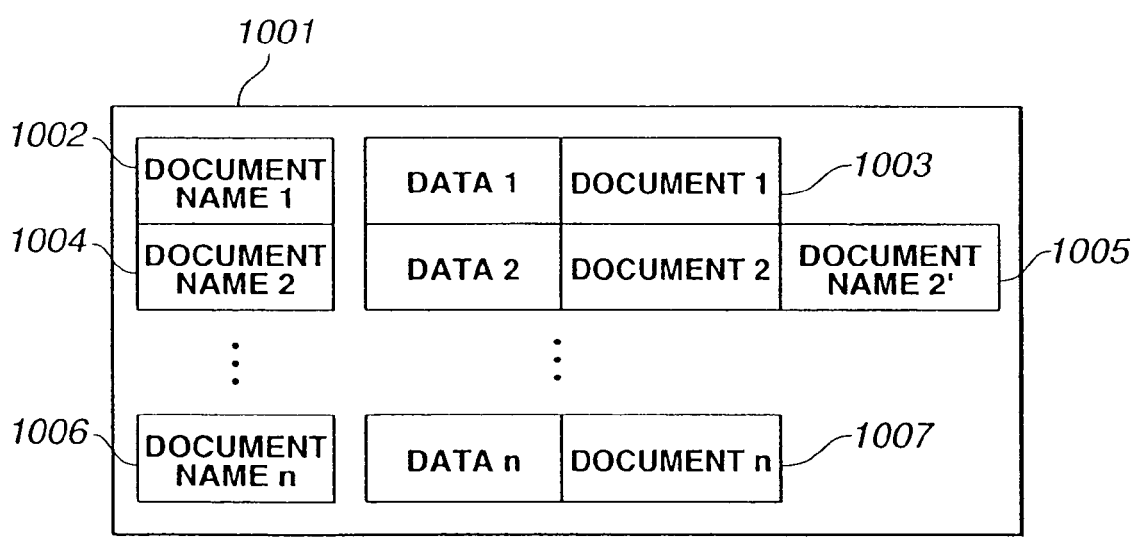
FIG. 10 is a diagram illustrating a table for the server for specifying document data and a document form necessary for image generation, based on a document name included in the HTTP request.

FIG. 10 illustrates a table 1001 for specifying document data and a document form (document template) necessary for generating an image, based on the document name included in the HTTP request. The table 1001 indicates combinations of document data and a document form corresponding to document names.

In this table 1001, document names 1002, 1004, - - -, 1006, and document data and document forms 1003, 1005, - - -, 1007, respectively, corresponding to documents are stored for respective documents. Reference numeral 1005 indicates that a plurality of document forms are necessary. Document data and a document form are extracted by retrieving the table shown in FIG. 10 based on the document name included in the HTTP request.

Figure 11:
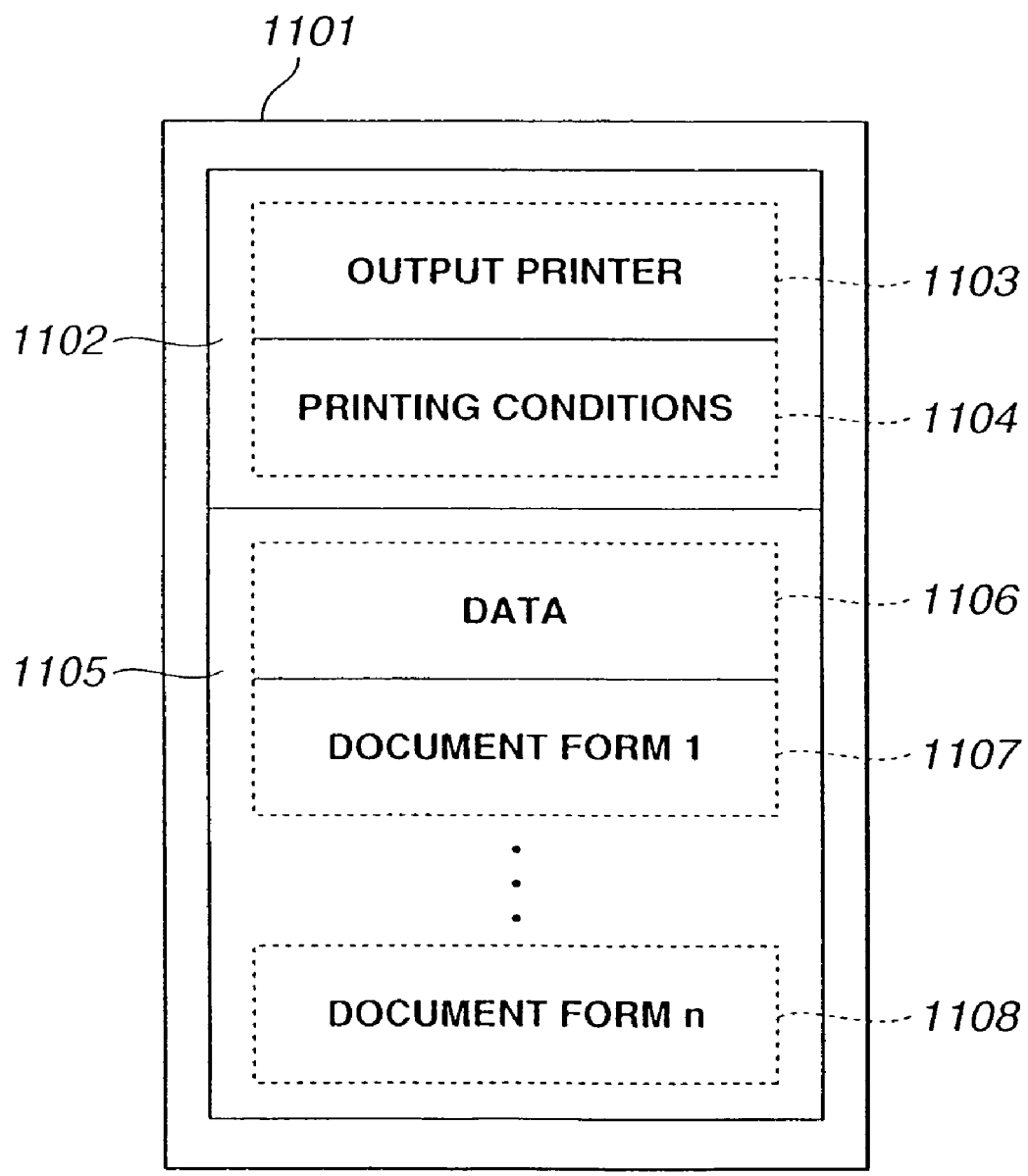
FIG. 11 is a diagram illustrating distribution data generated by the server.

FIG. 11 is a diagram illustrating distribution data generated by the server. In FIG. 11, reference numeral 1101 represents the entirety of distribution data to be distributed to the client. Reference numeral 1102 represents a header portion of the distribution data. Output-printer information is stored in a field 1103. Information relating to printing conditions is stored in a field 1104. Reference numeral 1105 represents a data portion of the distribution data. Data necessary for image generation is stored in a field 1106. A document form is stored in a corresponding one of fields 1107-1108. Even if a plurality of document forms are present, respective document forms can be consecutively stored in the data portion 1105.

Figure 12:
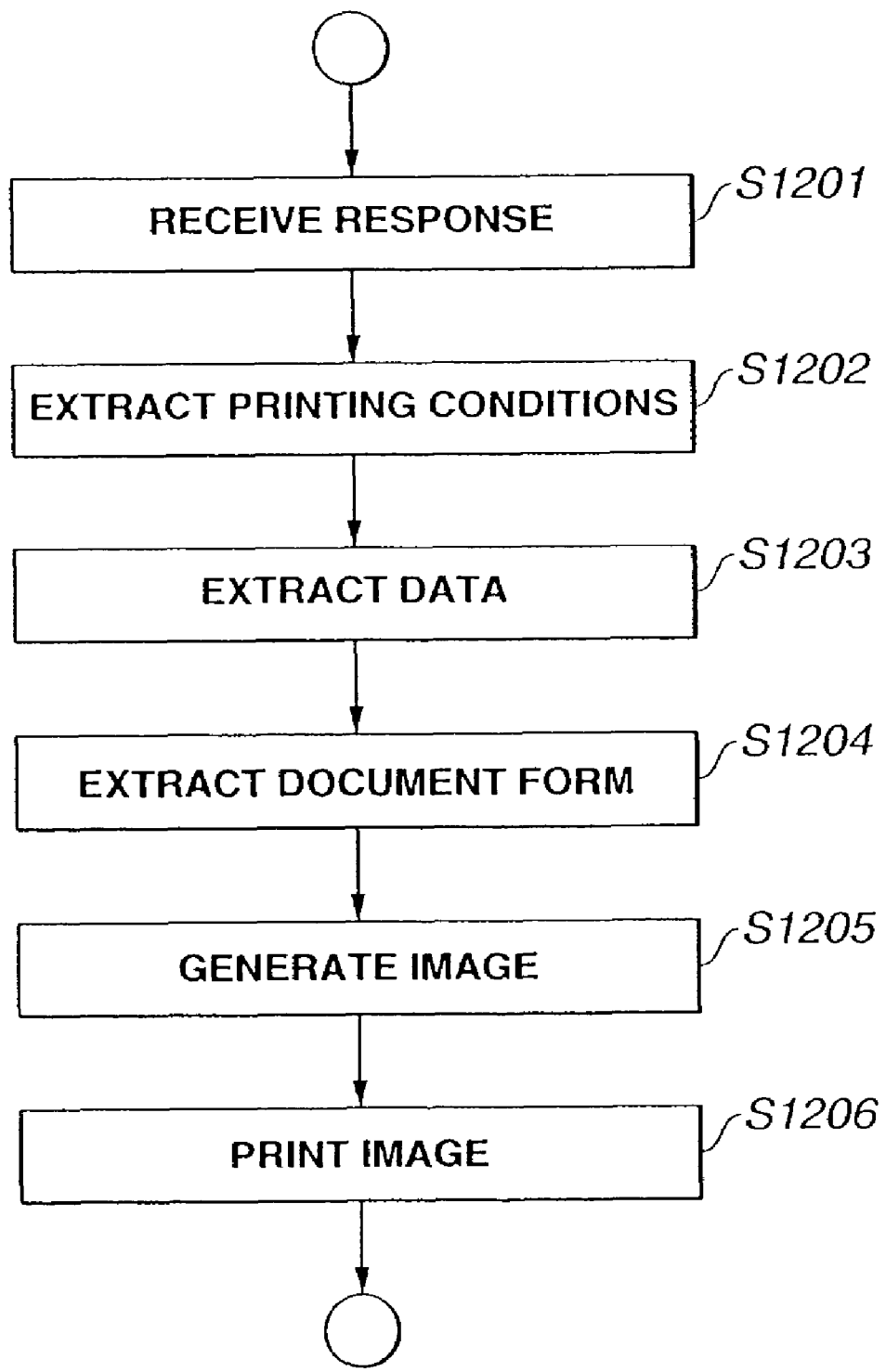
FIG. 12 is a flowchart illustrating processing in which the client that has received the distribution data from the server generates and prints an image.

FIG. 12 is a flowchart illustrating processing in which the client that has received distribution data distributed from the server generates an image and executes printing of the image. Steps S1201, S1202-1204, S1205 and S1206 are executed by the data input/output unit iii, the data processing unit 112, the image generation unit 115 and the print output unit 117, respectively.

In step S1201, distribution data formed by the server is received. In step S1202, printing conditions are extracted from the distribution data received in step S1201, and are stored in the memory. In step S1203, document data necessary for printing a document is extracted, and is stored as a file. In step S1204, a document form necessary for generating an image is extracted, and is stored as a file.

In step S1205, document printing data is generated based on the sets of information extracted in steps S1202-S1204. The method for generating the document printing data at that time is the same as the method of steps S602-S606. In step S1206, the print output unit 117 converts the document printing data into print-image data, and transmits the obtained data to the printer.

(Determination of a Function)

In the foregoing description, the printing processing using the server-side making function and the printing processing using the client-side making function are separately explained. In the following description, a procedure in which printing processing is performed by determining whether the server-side making function is to be used or the client-side making function is to be used will be explained.

Figure 13:
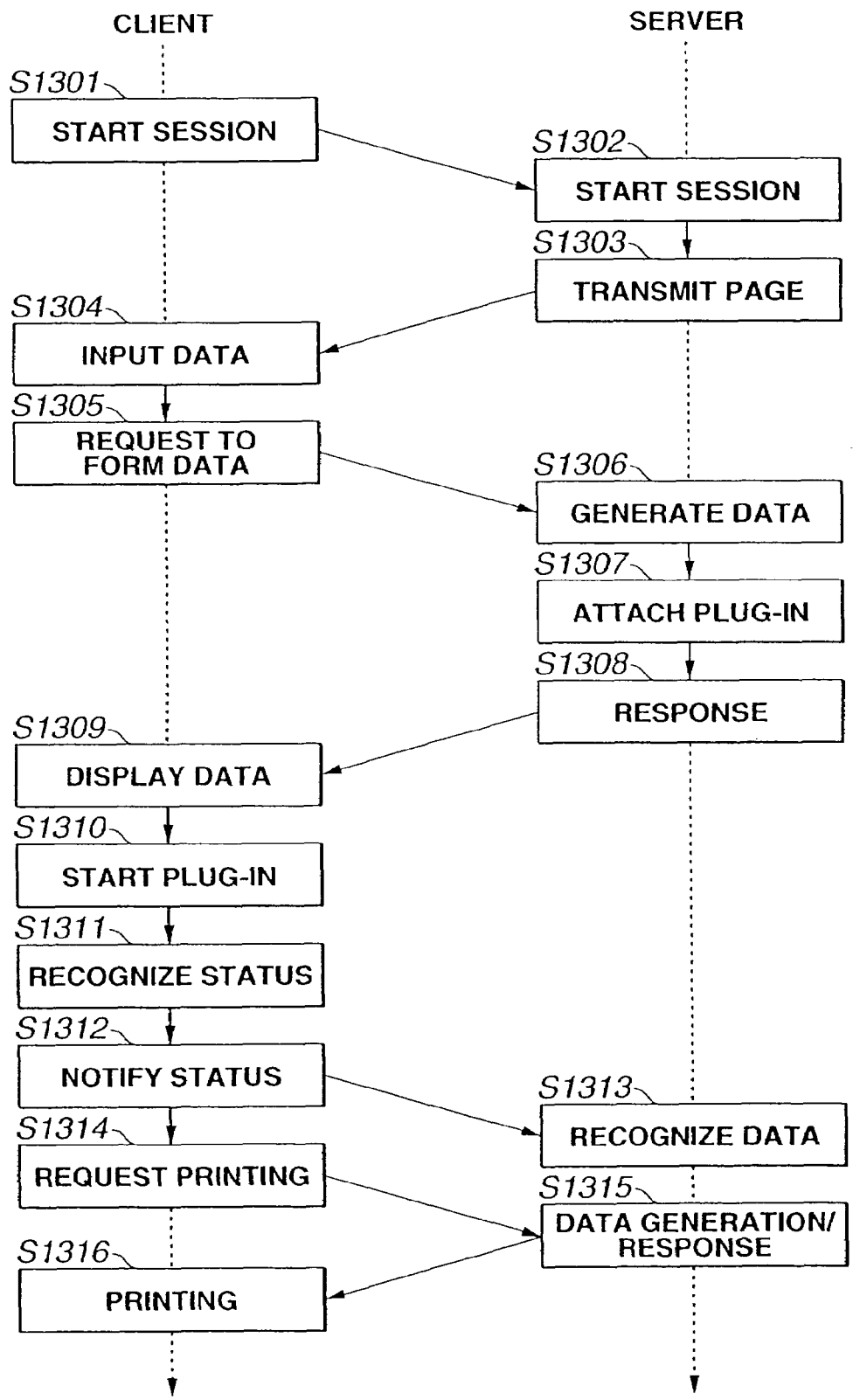
FIG. 13 is a diagram illustrating information exchange between the server and the client for forming a document.

FIG. 13 is a diagram illustrating information exchange between the server and the client for forming a document. In steps S1301 and S1302, the Web browser of the client announces start of processing for printing a document to the server. That is, a session is started between the client and the server. Upon start of the session, then, in step S1303, the server distributes data (HTML data) of a page for which document formation is urged, to the client.

In step S1304, the Web browser of the client displays the data to the user, and the user inputs various data. Upon completion of a series of data inputs, then, in step S1305, the client transmits a request to form a document to the server.

In step S1306, the server forms data of a document in response to the request from the client. Then, in step 81307, an execution module (termed a "plug-in") which can be executed by the client is attached to data to be transmitted to the client. Then, in step S1308, the data including the execution module is transmitted to the client.

By thus transmitting the plug-in from the server to the client and causing the client to execute the plug-in, the client need not have in advance particular software for determining a function. Furthermore, since the determination of a function can be automatically performed, the user need not know the details of the print system, and therefore a print system convenient for the user can be provided.

The client displays, in step S1309, the data transmitted from the user, and executes, in step S1310, the plug-in transmitted from the server. The plug-in can be automatically executed, and the status of execution can be transmitted. In step S1311, the executed plug-in determines whether or not an environment allowing the client-side making function is present at the client. In this determination, for example, it is detected whether or not software corresponding to the data processing unit 112 or the image generation unit 115 is installed at the client. If it is confirmed that such software is installed, it is then determined that the client-side making function can be used.

If the client-side making function cannot be used, the plug-in is terminated as an error. If the client-side making function can be used, the plug-in is normally terminated. In step S1312, the plug-in notifies the server of a status indicating whether or not the client-side making function can be used. In step S1313, the server can know whether or not the client of the current session can execute the client-side making function.

Thereafter, if a request for a printing operation is generated at the client, then, in step S1314, the client transmits a request for a printing operation to the server. In step S1315, the server generates document printing data or distribution data, and transmits one of these data to the client. Then, in step S1316, the client prints a document using the document printing data or the distribution data.

A feature in this processing is that an environment at the client is evaluated in step S1311, and the server recognizes the environment at the client. According to this recognition, the server can determine, in step S1315, whether or not expensive image generation is to be performed, i.e., whether document printing data is to be generated and transmitted, or only data is to be distributed, i.e., whether or not distribution data including a document form and data is to be generated and transmitted.

Figure 14:
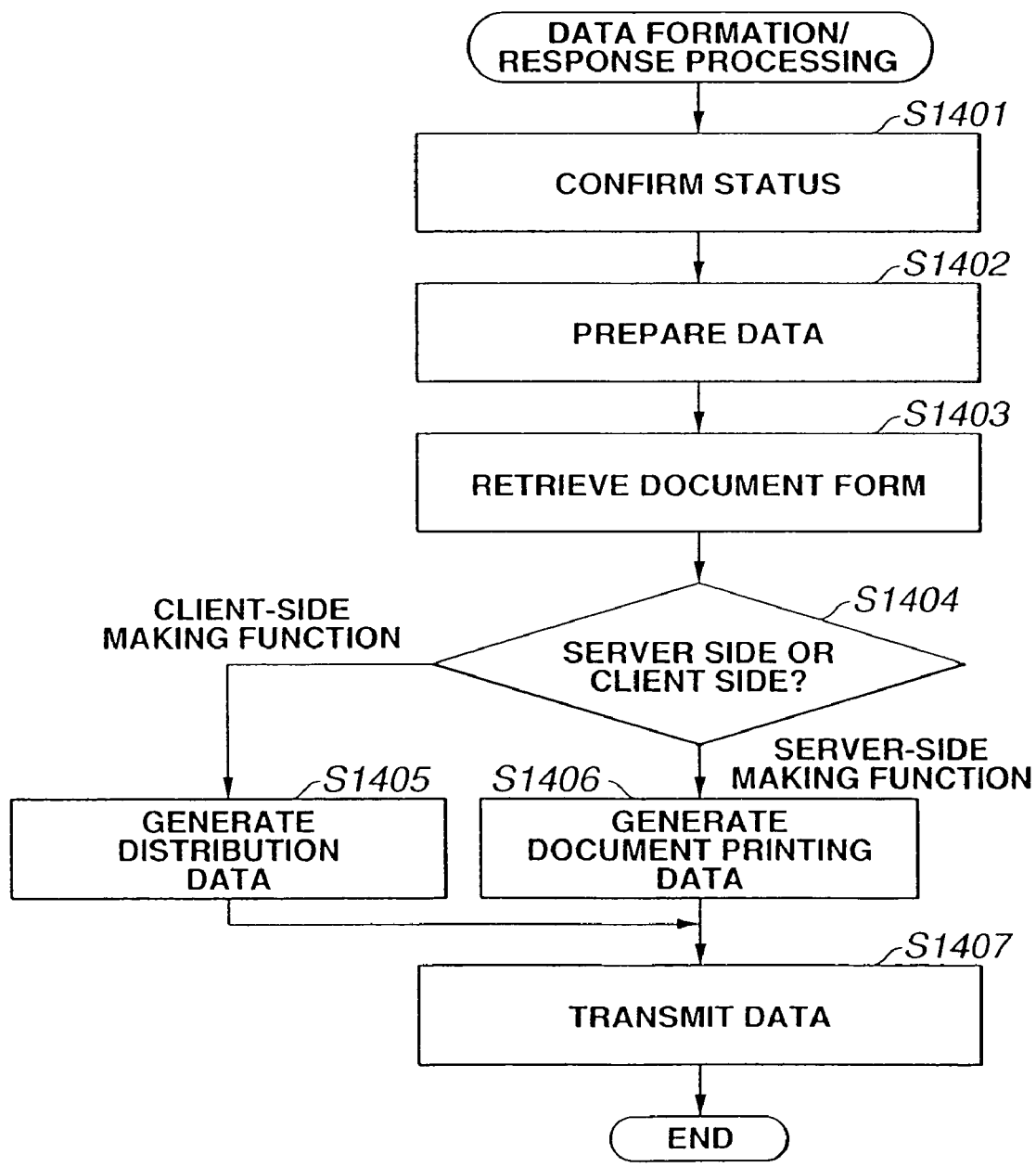
FIG. 14 is a flowchart illustrating data formation/response processing.

FIG. 14 is a flowchart illustrating data formation/response processing in step S1315 shown in FIG. 13. In this processing, the client requests formation of appropriate data corresponding to the client's capability. The data may printing-image data itself, or smaller data including text data and a document form.

In step S1401, the environment at the client that has already been known within the cession is again confirmed. Then, in step S1402, data necessary for document formation that has been formed within the cession is prepared. Actually, the data is reedited in a determined form, such as the CSV (Customized System Volume) form or the XML (Extensible Markup Language) form. Then, in step S1403, a form for a document to be used is retrieved.

In step S1404, it is determined whether the server-side making function is to be used, i.e., printing data in this session is to be transmitted to the client after forming document printing data within the server, or the client-side making function is to be used, i.e., a text and a document form are to be distributed to the client.

When using the server-side making function, image generation processing is performed within the server in step S1406. The processing at that time is as shown in FIG. 6. When it has been determined that the client-side making function can be used, processing of generating distribution data is performed in step S1405. The processing at that time is as shown in FIG. 8.

Then, in step S1407, the distribution data formed in step S1405 or the document printing data formed in step S1406 is transmitted to the client.

(Method for Supplying Control Programs)

Programs and related data according to the present invention are stored in a floppy disk (FD) or a CD-ROM, which supplies a computer with the stored data. FIG. 15 is a diagram illustrating a memory map in a state in which the programs and related data according to the present invention are stored in a FD or CD-ROM. The storage region of the FD or CD-ROM includes volume information, directory information, execution files relating to the program (program codes) according to the present invention, and related-data file of job accounts.

Figure 16:
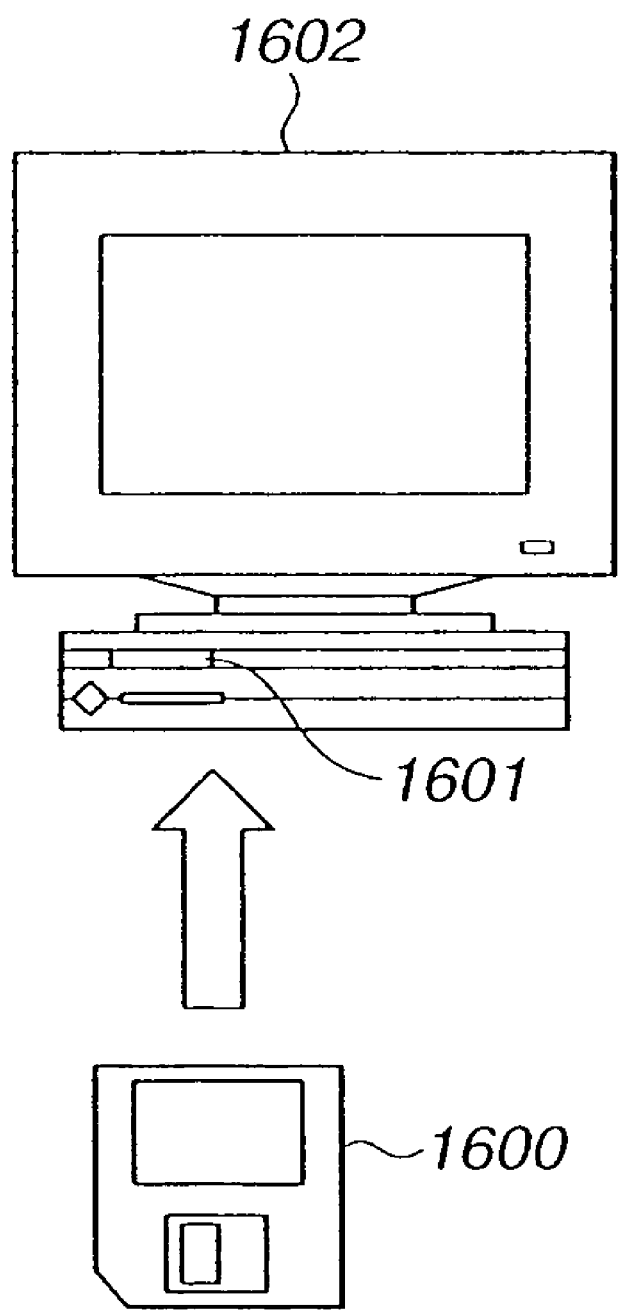
FIG. 16 is a diagram illustrating a method for supplying a computer with program codes.

The object of the present invention is achieved by supplying, as shown in FIG. 16, a computer with a storage medium (see FIG. 15) storing program codes of software (a control program) for realizing the functions of the above-described embodiment, and reading and executing the program codes stored in the storage medium by means of a device (a CPU 302) of the computer.

As shown in FIG. 16, a method for supplying a computer main body 1602 with a program or data as shown in FIG. 15 by storing the program or data in a floppy disk FD 1600 is generally adopted. In this case, program codes themselves read from the storage medium realize the functions of the above-described embodiment, so that the program codes and the storage medium storing the program codes constitute the present invention.

For example, an optical disk, a magnetooptical disk, a CD-ROM, a CD-R (recordable), a magnetic tape, a nonvolatile memory card, a ROM or the like other than a floppy disk or a hard disk may also be used as the storage medium for supplying the program codes.

The present invention may, of course, be applied not only to a case in which the functions of the above-described embodiment are realized by executing program codes read by a computer, but also to a case in which an OS (operating system) or the like operating in a computer executes a part or the entirety of actual processing, and the functions of the above-described embodiment are realized by the processing.

The present invention may, of course, be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiment are realized by the processing.

As described above, according to the present invention, a user intending to print a document or the like via a Web browser can perform printing by obtaining data necessary for document printing according to an optimum method without being conscious of an environment of a client used by the user, and can form a document without concerning the load of a network and the load of a server.

Particularly, by transmitting a program for determining whether or not a client has a function of generating printing data, from a server to the client, and causing the client to execute the program, the client need not have in advance particular software for determining a function. Furthermore, since the determination of a function is automatically performed, the user need not know the details of a print system, and therefore it is possible to provide a print system which is convenient for the user.

The individual components shown in outline or designated by blocks in the drawings are all well known in the print system and information processing apparatus arts and their specific construction and operation are not critical to the operation of the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A print system comprising a server and a client, wherein the server includes:

acquisition means for acquiring a template for generating inserted data corresponding to information displayed at a client, and data to be inserted in the template, in response to a request from the client;

generation means for generating the inserted data corresponding to the displayed information, by inserting the data into the template acquired by said acquisition means;

selection means for selecting at least one transmission method from plural transmission methods, in accordance with information transmitted from the client, wherein the plural transmission methods include at least a first transmission method, in which the template and the data are transmitted to the client without insertion processing, and a second transmission method, in which the inserted data generated by the generation means is transmitted to the client; and program transfer means for transferring to the client a program for determining whether the client has a function of generating the inserted data by inserting the data into the template acquired by the acquisition means, wherein the selection means selects the at least one transmission method in accordance with information indicating the function of the client obtained from the program transferred to the client by the program transfer means.

2. A print system according to claim 1, wherein the template is a document form.

3. A print system according to claim 1, wherein the information is displayed by a Web browser based on display data transmitted to the client, and wherein the request is transferred according to a communication from the Web browser of the client.

4. A print system according to claim 3, wherein the display data transmitted to the client is described in HTML (Hyper Text Markup Language), and communications from the Web browser use HTTP (Hyper Text Transfer Protocol).

5. An information processing apparatus that communicates with a client, the information processing apparatus comprising:

acquisition means for acquiring a template for generating inserted data corresponding to information displayed at the client, and data to be inserted in the template, in response to a request from the client;

generation means for generating the inserted data corresponding to the displayed information, by inserting the data into the template acquired by the acquisition means;

selection means for selecting at least one transmission method from plural transmission methods, in accordance with information transmitted from the client, wherein the plural transmission methods include at least a first transmission method, in which the template and the data are transmitted to the client without insertion processing, and a second transmission method, in which the inserted data generated by the generation means is transmitted to the client; and program transfer means for transferring to the client a program for determining whether the client has a function of generating the inserted data by inserting the data into the template acquired by the acquisition means, wherein the selection means selects the at least one transmission method in accordance with information indicating the function of the client obtained from the program transferred to the client by the program transfer means.

6. An information processing apparatus according to claim 5, wherein the template is a document form.

7. An information processing apparatus according to claim 5, wherein the information is displayed by a Web browser of the client based on display data transmitted to the client, and wherein the request is transferred according to a communication from the Web browser of the client.

8. An information processing apparatus according to claim 7, wherein the display data transmitted to the client is described in HTML (Hyper Text Markup Language), and communications with the Web browser of the client use HTTP (Hyper Text Transfer Protocol).

9. An information processing method performed by an information processing apparatus that includes a central processing unit coupled to a memory unit storing a program for communicating with a client, the information processing method comprising:

acquiring, by the central processing unit, a template for generating inserted data corresponding to information displayed at the client, and data to be inserted in the template, in response to a request from the client;

generating the inserted data corresponding to the displayed information, by inserting the data into the template acquired by the acquiring;

selecting at least one transmission method from plural transmission methods, in accordance with information transmitted from the client, wherein the plural transmission methods include at least a first transmission method, in which the template and the data are transmitted to the client without insertion processing, and a second transmission method, in which the inserted data generated by the generating is transmitted to the client; and transferring, by the central processing unit, from the information processing apparatus to the client a program for determining whether the client has a function of generating the inserted data by inserting the data into the template acquired by the acquiring wherein the at least one transmission method is selected in accordance with information indicating the function of the client obtained from the program transferred from the information processing apparatus to the client.

10. An information processing method according to claim 9, wherein the template is a document form.

11. An information processing method according to claim 9, wherein the information is displayed by a Web browser of the client based on display data transmitted from the information processing apparatus to the client, and wherein the request is transferred according to a communication from the Web browser of the client to a Web server of the information processing apparatus.

12. An information processing method according to claim 11, wherein the display data transmitted from the information processing apparatus to the client is described in HTML (Hyper Text Markup Language), and the Web browser and the Web server communicate using HTTP (Hyper Text Transfer Protocol).

13. A computer-readable storage medium storing a program, in executable form, for performing an information processing method used by an information processing apparatus to communicate with a client, the program comprising:

code for acquiring a template for generating inserted data corresponding to information displayed at the client, and data to be inserted in the template, in response to a request from the client;

code for generating the inserted data corresponding to the displayed information, by inserting the data into the template acquired by the code for said acquiring;

code for selecting at least one transmission method from plural transmission methods, in accordance with information transmitted from the client, wherein the plural transmission methods include at least a first transmission method, in which the template and the data are transmitted to the client without insertion processing, and a second transmission method, in which the inserted data generated by the information processing apparatus is transmitted to the client; and code for transferring to the client a program for determining whether the client has a function of generating the inserted data by inserting the data into the template acquired by execution of the code for acquiring wherein the at least one transmission method is selected in accordance with information indicating the function of the client obtained from the program transferred to the client by execution of the code for transferring.

14. A computer-readable storage medium according to claim 13, wherein the template is a document form.

15. A computer-readable storage medium according to claim 13, wherein the information is displayed by a Web browser of the client based on display data transmitted to the client, and wherein the request is transferred according to a communication from the Web browser of the client.

16. A computer-readable storage medium according to claim 15, wherein the display data transmitted to the client is described in HTML (Hyper Text Markup Language), and communications with the Web browser use HTTP (Hyper Text Transfer Protocol).

* * * * *